United States Patent
Vlassoff et al.

(10) Patent No.: US 12,196,341 B2
(45) Date of Patent: Jan. 14, 2025

(54) MANUFACTURING A VALVE PLUG TO REDUCE EROSION

(71) Applicant: Dresser, LLC, Houston, TX (US)

(72) Inventors: Cyril Nicolas Vlassoff, Saint-Georges des Groseillers (FR); George Dodan, St. Johns, FL (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/976,931

(22) Filed: Oct. 31, 2022

(65) Prior Publication Data

US 2024/0142003 A1 May 2, 2024

(51) Int. Cl.
*F16K 5/04* (2006.01)
*F16K 1/54* (2006.01)
*F16K 5/08* (2006.01)

(52) U.S. Cl.
CPC ............... *F16K 5/045* (2013.01); *F16K 1/54* (2013.01); *F16K 5/08* (2013.01)

(58) Field of Classification Search
CPC ... F16K 5/045; F16K 5/08; F16K 1/54; F16K 1/52; F16K 3/32; F16K 3/34; F16K 5/10; F16K 25/04; F16K 25/005; F16K 1/36
USPC .......................................... 251/120, 121, 122
See application file for complete search history.

(56) References Cited

U.S. PATENT DOCUMENTS

| | | | | |
|---|---|---|---|---|
| 2,014,314 A | * | 9/1935 | Defenbaugh | E21B 34/025 251/359 |
| 2,516,825 A | * | 7/1950 | Hejduk | F16K 3/34 251/903 |
| 2,980,392 A | * | 4/1961 | Greenwood | F16K 1/52 251/210 |
| 3,170,669 A | * | 2/1965 | Roos | F16K 5/184 251/210 |
| 3,187,775 A | * | 6/1965 | Pinnell | F16K 1/52 137/903 |
| 3,410,521 A | * | 11/1968 | Sowers, III | F16K 1/52 251/64 |

(Continued)

FOREIGN PATENT DOCUMENTS

| | | |
|---|---|---|
| CN | 203697597 U | 7/2014 |
| CN | 208605634 U | 3/2019 |

(Continued)

OTHER PUBLICATIONS

Masoneilan 7400 Series Erosion Resistant Control Valves, Baker Hughes Company (2021).

(Continued)

*Primary Examiner* — Craig J Price
*Assistant Examiner* — Andrew J Rost
(74) *Attorney, Agent, or Firm* — Paul Frank + Collins P.C.

(57) ABSTRACT

A closure member is configured for use in a valve. These configurations may include a plug with grooves or "flutes" that extend along its length. Inserts in the flutes may comprise materials, like ceramics, that are different than the material that forms the core or base portion of the plug. These inserts are useful to slow erosion of the device, particularly in the flutes, which form an outwardly-facing surface that is subject to high velocity flow in the valve. This feature can extend service life of the plug, particularly in highly-erosive process fluids, like particle-entrained fluids commonly found in hydrocracking or refining operations.

20 Claims, 7 Drawing Sheets

(56) References Cited

U.S. PATENT DOCUMENTS

| | | | | |
|---|---|---|---|---|
| 3,511,470 | A | * | 5/1970 | Beckett .................. F16K 1/52 137/454.6 |
| 3,980,150 | A | * | 9/1976 | Gigli ...................... B62H 1/10 180/209 |
| 3,985,150 | A | * | 10/1976 | Kindersley ........... F16K 47/045 251/315.15 |
| 4,130,128 | A | * | 12/1978 | Kaneko ................ F16K 5/0605 251/207 |
| 4,157,808 | A | * | 6/1979 | Eidsmore ............... F16K 47/04 251/205 |
| 5,070,909 | A | * | 12/1991 | Davenport ........... F16K 5/0605 251/315.08 |
| 5,180,139 | A | * | 1/1993 | Gethmann ........... F16K 5/0605 251/207 |
| 5,324,008 | A | * | 6/1994 | Bonetti ................ F16K 5/0605 251/315.16 |
| 5,509,446 | A | * | 4/1996 | Bey ........................ F16K 5/12 251/127 |
| 5,516,079 | A | * | 5/1996 | Baumann ............. F16K 31/126 137/625.3 |
| 5,680,889 | A | * | 10/1997 | Boger ..................... F16K 5/12 251/121 |
| 5,707,041 | A | | 1/1998 | Bovee et al. |
| 5,718,410 | A | * | 2/1998 | Baumann ................ F16K 1/34 251/191 |
| 5,771,929 | A | * | 6/1998 | Boger .................. F16K 47/045 251/127 |
| 5,901,746 | A | * | 5/1999 | Andersson ............... F16K 1/54 137/861 |
| 6,609,697 | B2 | * | 8/2003 | Gsteu .................... F16K 3/246 137/625.3 |
| 6,807,984 | B2 | * | 10/2004 | Volovets ................. F16K 3/34 251/335.1 |
| 6,953,056 | B1 | * | 10/2005 | Chrisp .................... F16K 1/36 137/625.33 |
| 7,129,877 | B2 | * | 10/2006 | Wang .................... H03M 1/68 341/172 |
| 7,363,941 | B2 | | 4/2008 | Caprera |
| 8,141,843 | B2 | * | 3/2012 | Rimboym ............ F16K 5/0605 251/315.01 |
| 11,280,422 | B1 | | 3/2022 | Brydon et al. |
| 2001/0032957 | A1 | * | 10/2001 | Haines ................ F16K 5/0647 251/315.04 |
| 2006/0130911 | A1 | * | 6/2006 | Caprera ................. F16K 47/04 137/614.11 |
| 2007/0040136 | A1 | * | 2/2007 | Caprera ................... F16K 1/54 251/122 |
| 2017/0165623 | A1 | | 6/2017 | Bories et al. |
| 2020/0248819 | A1 | | 8/2020 | Stadlberger et al. |
| 2022/0185678 | A1 | | 6/2022 | Vlassoff et al. |

FOREIGN PATENT DOCUMENTS

| | | |
|---|---|---|
| CN | 212107099 A | 12/2020 |
| JP | 01-172683 A | 7/1989 |

OTHER PUBLICATIONS

Masoneilan 74000 Series Erosion Resistant Valves (technical manual), Baker Hughes Company (2021).

* cited by examiner

MANUFACTURING A VALVE PLUG TO REDUCE EROSION

BACKGROUND

Flow controls play a large role in many industrial facilities. Power plants and industrial process facilities, for example, use different types of flow controls to manage flow of a material, typically fluids, throughout vast networks of pipes, tanks, generators, and other equipment. Control valves are useful to accurately regulate flow to meet process parameters. In oil and gas industry, operators may deploy control valves to control flow of debris-entrained fluids in hydrocracking or related processes.

Fluids in these processes are known to be highly-erosive. The materials may cause parts of the valve found directly in the flow to degrade rapidly. Use of entrained solids, such as coke, coal fines, or catalysts, within the process fluid may inhibit valve throttling, reduce total flow capacity, and potentially clog valves. Large pressure reductions of this complex fluid may produce outgassing, where three-phase flow (e.g., solid, liquid, and vapor) co-exist simultaneously. The pressure reduction and resulting fluid expansion phase change may increase solid particle velocity within the fluid. These particles may act as a high-intensity "sand blaster" that erodes any surface within the flow path. Process parameters may intensify damage from these particles because temperatures, typically in the range of 400° C., tend to make materials even more susceptible to erosion, as well.

Other demanding process conditions may prevail as well. These conditions include vibrations, mechanical cycling (continuous throttling), and valve lift position. Thermal cycling can introduce alternating expansion and contraction loading. For parts with base materials and hardened coating materials with different expansion rates, thermal cycling can cause the coating or "overlay" to spall, flake, or generally separate from the base, exposing the base to the highly-erosive flow.

SUMMARY

The subject matter of this disclosure relates to improvements that can lengthen service life of parts that are subject to highly corrosive or erosive environments. Of particular interest are embodiments of parts with structure made of different materials. This "hybrid" design may deploy materials that can better resist erosion in places that reside in flow of highly-erosive working fluids. For valve plugs or "closure members," this design can incorporate material layers or inserts onto a "core" part. These inserts bear the brunt of the aggressive erosion due to the working fluids. The design is beneficial, though, because it also maintains flexibility or other properties of the core that are important to overall functions of the device.

DRAWINGS

This specification refers to the following drawings.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in the drawings noted above. These features provide a new approach to construct valve plugs or like parts that reside in the flow of working fluids. This approach may provide interchangeable parts at critical locations along the valve plug. These parts may adopt materials with properties that are well-suited for use in the working fluid. Other embodiments are within the scope of this disclosure.

Figure 1:
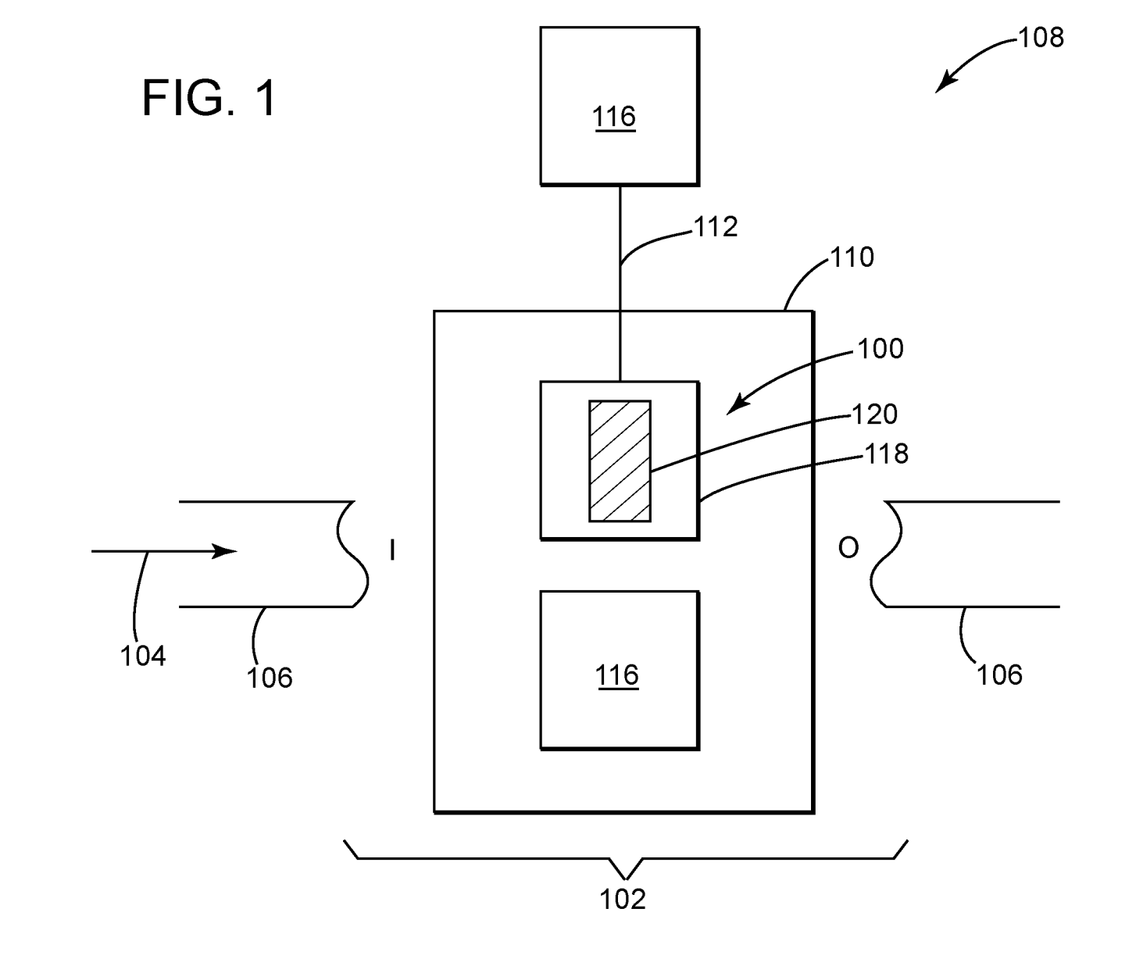
FIG. 1 depicts a schematic diagram of an exemplary embodiment of closure member.

FIG. 1 depicts an example of a closure member 100. This example is found in a distribution network 102, typically designed to carry material 104 through a network of conduit 106. The network 102 may include a flow control 108 that has a valve body 110 to connect in-line with the conduit 106. A valve stem 112 may couple the closure member 100 with an actuator 114. This arrangement can manage the position of the closure member 100 relative to a seat 116. In one implementation, the closure member 100 may form a plug 118 with a control section 120.

Broadly, the closure member 100 may be configured to better survive harsh working fluids or like operating conditions. These configurations may embody parts that use different materials in different (or often strategic) locations that reside in flow of the working fluid. The parts may help regulate flow a valve; although the concepts here may apply to other functions within these types of devices.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 is often made of cast or machined metals. This structure may form a flange at openings I, O. Adjacent pipes 106 may connect to these flanges. The valve stem 112 may form an elongate cylinder or rod that directs a load from the actuator 114 to the closure member 100. The load may result from compressed or pressurized air along with a piston, spring (or springs), or a flexible diaphragm. This feature helps locate the closure member 100 in a desired position relative to the seat 116. This desired position or "set point" may correspond with flow parameters for the material 104 to meet process requirements or parameters. The plug 118 may move relative to the seat 116 to meet or achieve the set point. Movement is generally along an axis of the seat 116, or "up" or "down" for those valves that orient vertically on the process line. As noted, the position of the plug 118 may correspond directly with the flow rate of natural gas (or other resource) that flows through the seat 116 (or from its upstream side to its downstream side).

The control section 120 may be configured to control this flow across the plug 118. These configurations may include features that can direct or maintain the flow substantially parallel to the surface of the plug 118. These features may embody geometry (like grooves or recesses) that extend along the length of the plug 118. Often referred to as "flutes," this "fluted" design may create an outer surface on the plug 118 that separates the incoming high velocity flow into individual streams $F_1$, which in turn equally disperse total fluid energy about the circumference of the part. An added benefit of the fluted design is that it results in pressure loading that helps maintain stability of the plug 118 in the flow control 108. In one implementation, the flutes may comprise materials with properties that resist erosion. These materials are likely harder than the remainder of the plug 118 or "base," which can protect the base from erosion within the flute; but such materials may be brittle or particularly subject to fracture under certain stresses. It may benefit the design, then, for the "base" to comprise materials that are different from the flutes. This "hybrid" construction is important because the base material(s) may provide certain flexibility to the plug 118 that helps with alignment, while the flute material(s) may prevent or slow erosion of the plug 118 to extend service life in the high velocity flow.

Figure 2:
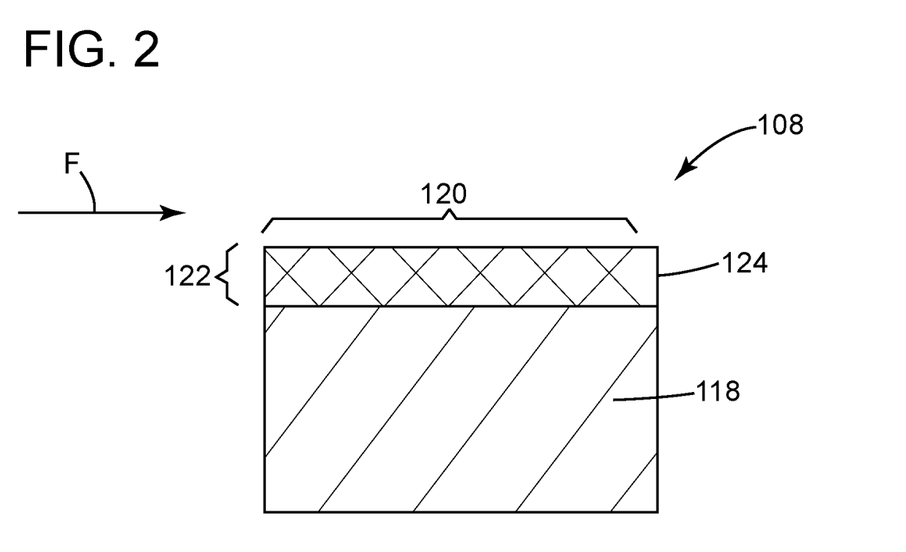
FIG. 2 depicts an elevation view of the cross-section of an example of the closure member of FIG. 1.

FIG. 2 depicts an elevation view of the cross-section of an example of structure for the plug 118. The control section 120 may have a groove 122. A layer 124 may extend along all or part of the length of the groove 122, creating an outwardly-facing or exposed surface S that is proximate the seat 116 or is facing the seat 116. This outwardly-facing surface S may bear the brunt of the high velocity flow in service on a process line or network. The layer 124 may comprise material, like ceramics, which may be different from material of the plug 118 as noted above. These ceramics may have properties that make them more brittle than the plug material(s); but the ceramic may be harder or more protective than the plug material(s). As noted above, this hybrid material design may extend the service life of the plug 118. In one implementation, the plug 118 may comprise Inconel alloy(s). This material provides the plug 118 with certain flexibility to accommodate for misalignment between it and the seat 116. This feature can ensure proper engagement between these parts to allow the valve 108 to accurately control flow through the device. The layer 124, may comprise Zirconia, tungsten carbide (WC), or other ceramic. These materials are particularly resistant to erosion from the high velocity fluid or other hard working conditions. These properties may maintain integrity of the control section 120 for much longer in the field.

Figure 3:
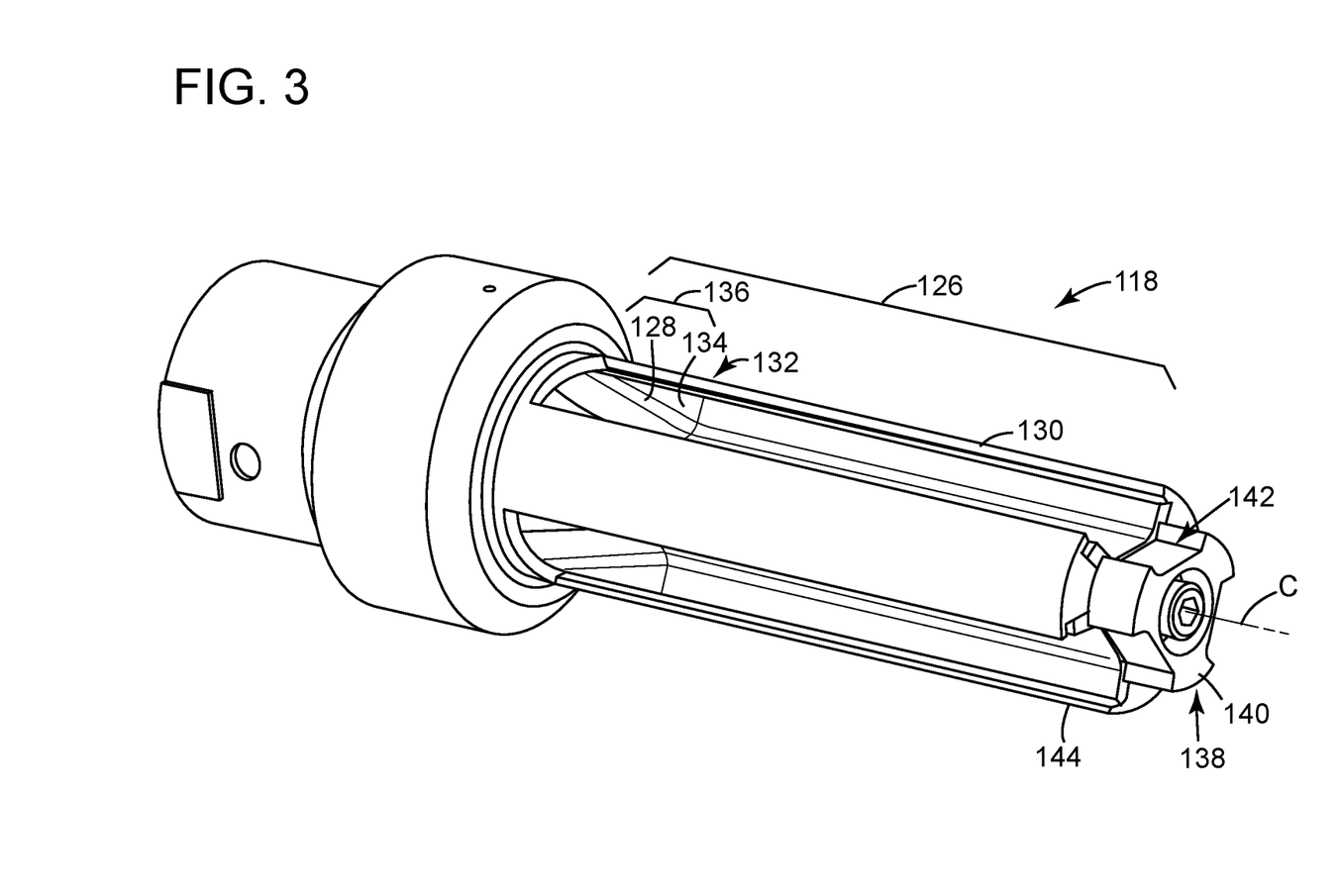
FIG. 3 depicts a perspective view of an example of the closure member of FIG. 1.

FIG. 3 depicts a perspective view that illustrates an example of structure for the plug 118. The layer 124 may embody an insert 126 that assembles into the groove 122, for example, as a separate part that attaches to plug 118 by way of fastener (like adhesive or screws or like mechanical technique). This feature may permit the insert 126 to remove independently from the plug 118. The insert 126 may have multiple parts or pieces 128, 130. It may benefit the design for the parts 128, 130 to contact or abut one another at a joint 132 in a way that forms a control surface 134 that is contiguous or generally continuous along the length of the groove 122. This feature may prevent perturbations in flow F that might further enhance damage or erosion in the control section 120. In one example, the control surface 134 may terminate on one end at a tapered region 136. A locking mechanism 138 may reside at the other end to secure the insert 126 in position in the groove 122. In one implementation, the locking mechanism 138 may include a lock 140 with grooves 142 forming a groove surface 144 disposed circumferentially about its center axis C. Technicians can assemble the lock 140 onto the end of the plug 118 to ensure that the groove surface 144 aligns with the control surface 134 of each control section 120 on the device.

Figure 4:
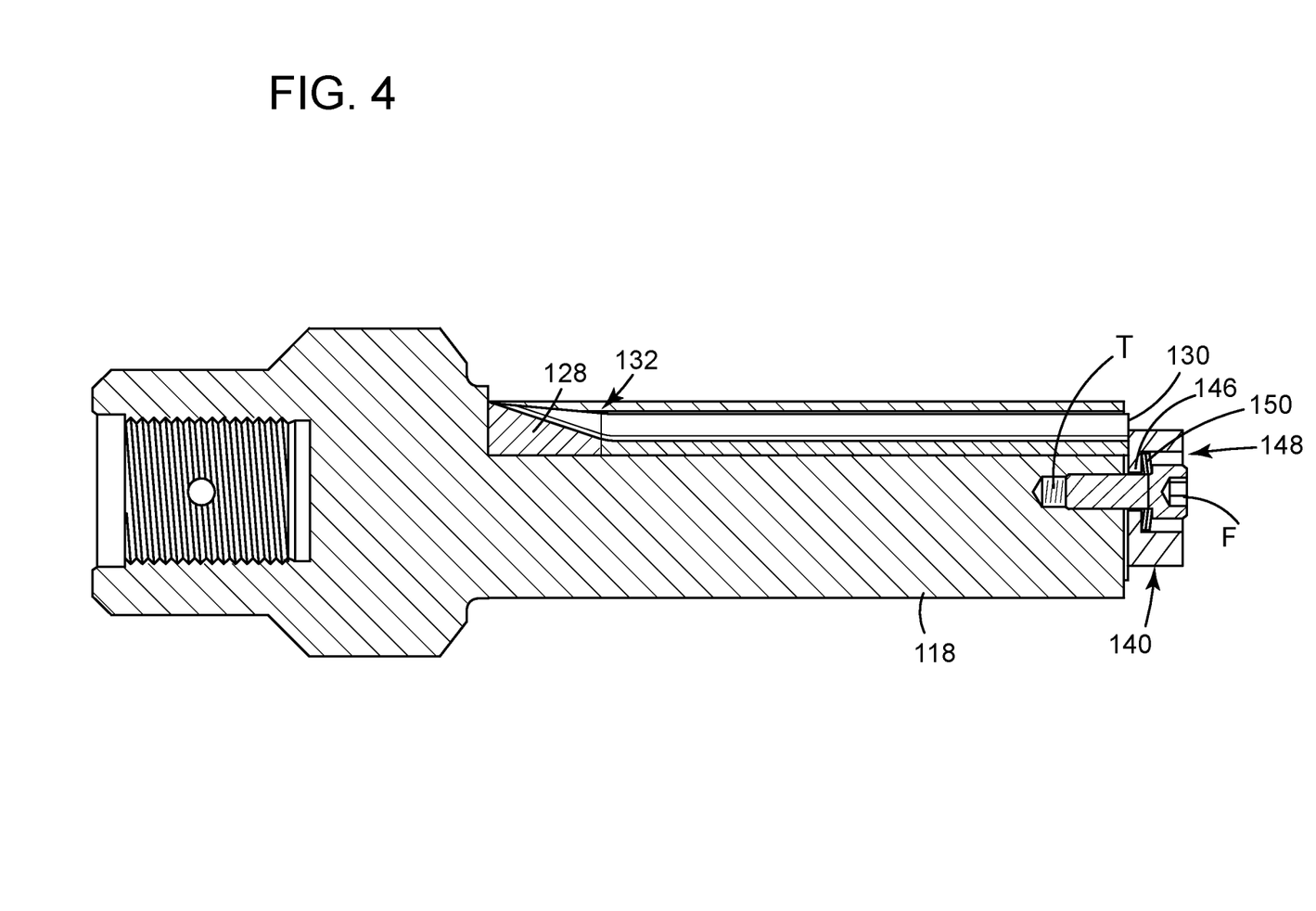
FIG. 4 depicts an elevation view of the cross-section of the example of FIG. 3.

FIG. 4 depicts an elevation view of the cross-section of the example of FIG. 3. The lock 140 may also have a through-hole 146 and a concentric counter-bore 148. One or more lock washers 150 may reside in the counter-bore 148. A fastener F may insert through the lock-washers 150 to engage with, for example, a complimentary threaded hole T on the end of the plug 118. Technicians can tighten the fastener F, which compresses the lock-washers 150 to generate force on the lock 140 to secure the parts 128, 130 in the groove 120. Additional assembly modalities, like adhesives, may also find use to secure the parts 128, 130 in position as part of the plug 118.

Figure 5:
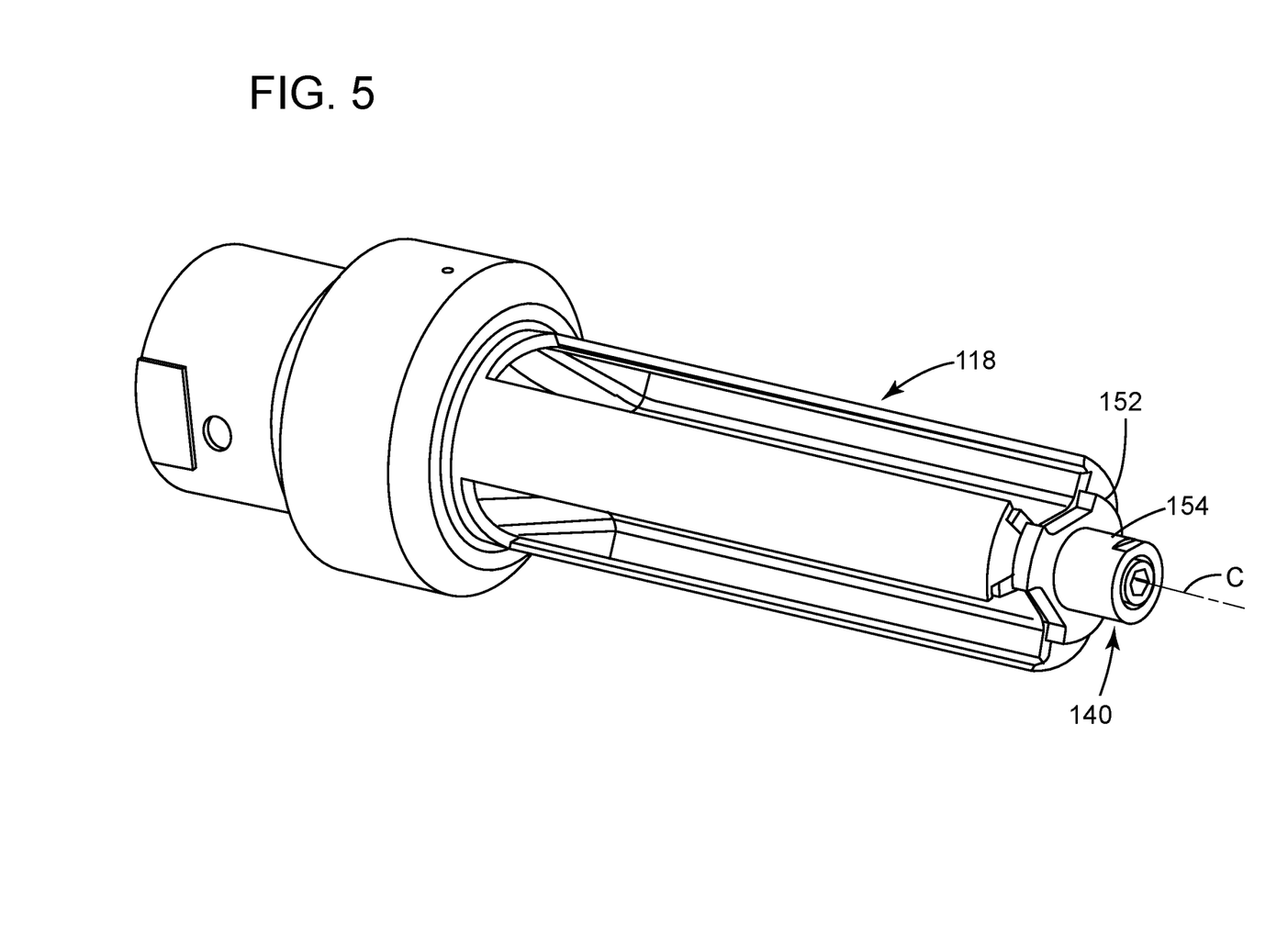
FIG. 5 depicts a perspective view of an example of the closure member of FIG. 1
Figure 6:
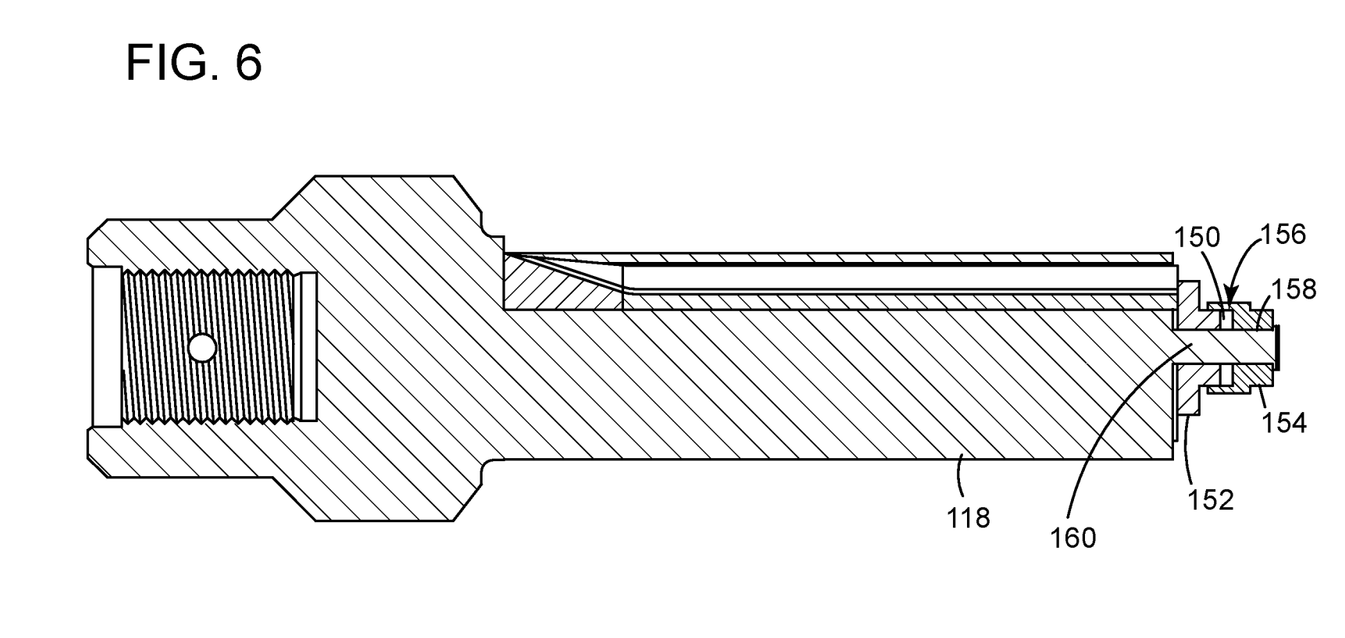
FIG. 6 depicts an elevation view of the cross-section of the example of FIG. 3.

FIGS. 5 and 6 depict various views of an example of structure for the plug 118. The lock 140 may embody a thin disc 152 and an end cap 154. As best shown in the cross-section of FIG. 6, the end cap 154 may have a recess 156 and a through-hole 158 that receives a boss 160 that extends from the end of the plug 118. The boss 160 may embody a protruding part that forms unitarily or monolithically with the plug 118; however, this disclosure contemplates that a pin or like implement might prevail as well. Technicians can slide the thin disc 152 and lock washers 150 onto the boss 160. The end cap 154 inserts onto the boss 160 to receive the lock washers 150 into the recess 156. A press or interference fit between the through-hole 156 and the boss 160 may secure the assembly in position. It may benefit the design to include a fastener or e-ring to the end of the boss 160 as well.

Figure 7:
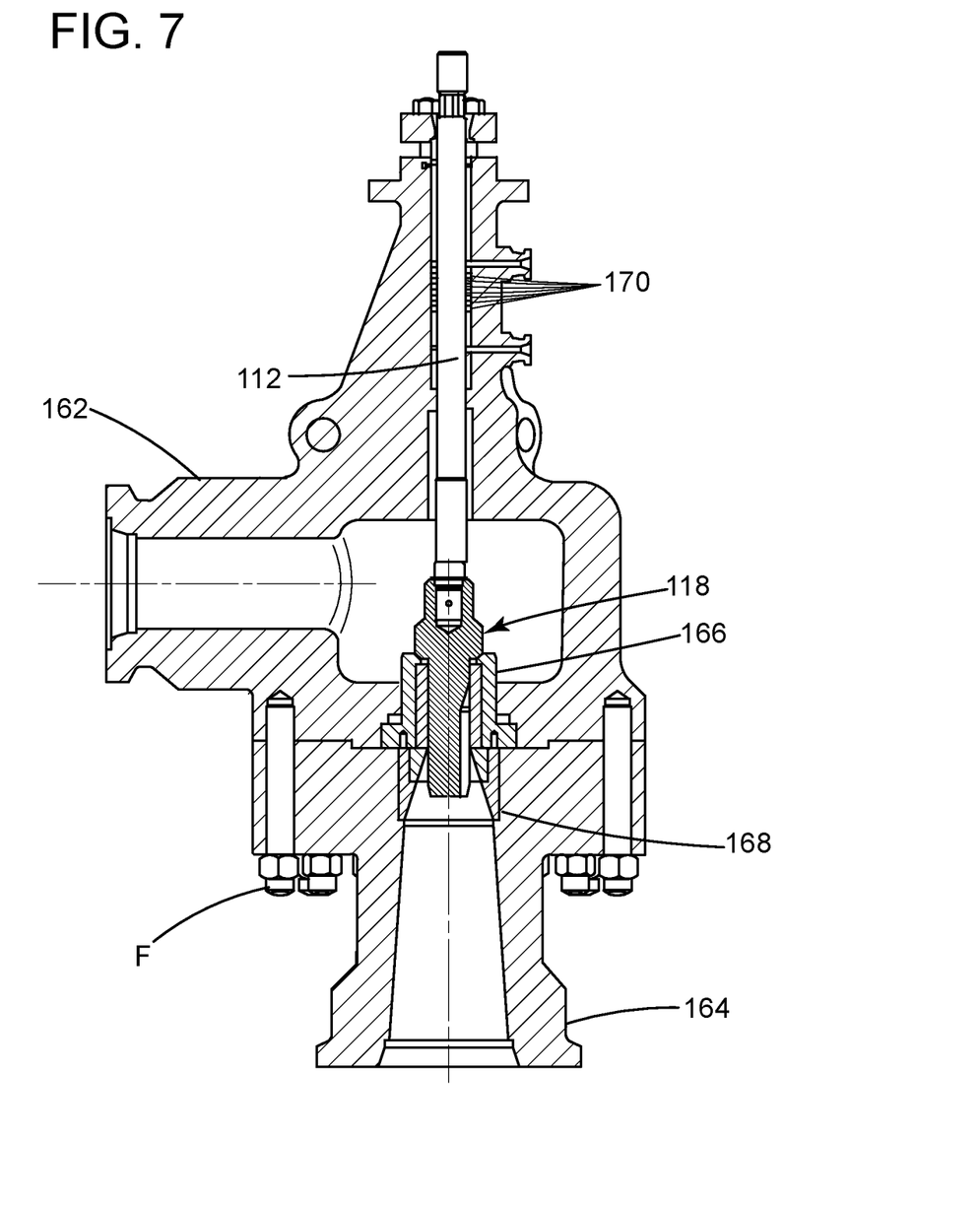
FIG. 7 depicts an elevation view of the cross-section of a flow control.

FIG. 7 depicts an elevation view of the cross-section of structure for the flow control 108. The valve body 110 may comprise an upper member 162 that secures with a lower member or "flange" 164. Fasteners F, like nuts and bolts, may work for this purpose. The seat 116 may comprise a seat ring 166. A venturi housing 168 may reside in the flange 164 below the seat ring 166. In one implementation, the valve stem 112 may extend through packing 170 in the member 162 to locate the plug 118 in proximity to a seat ring 166. The packing 170 is useful to allow movement of the valve stem 112, but prevent the flow control 108 from emitting fugitive emissions.

In view of the foregoing, the improvements herein addresses operator concerns about life expectancy of certain parts on their process lines. These concerns frustrate use of certain materials because their inherent properties are not conducive with the working fluids. For example, hardened martensitic stainless steel lacks corrosion resistance to survive working fluid in many applications, including hydrocracking. Base-level austenitic stainless steels have the necessary corrosion resistance; but these materials are inherently too soft for mechanical loading seen in flow controls found in many process lines. On the other hand, high-performance alloys or ceramics, like Inconel or solid tungsten carbide, appear to meet requirements for corrosion, hardness, or strength. But many types of these materials are too brittle or, like other steels, become too brittle as hardness increases to survive under duress of harsh or caustic working fluids. This weakness can lead to fracture under non-symmetrical mechanical loading, which may occur when particles or debris entrained in working fluid becomes caught between moving parts. Further, brittle materials often fail in response to vibration. These conditions may arise in high-pressure systems from a combination of pressure drops along the system and changes in direction of the high-velocity flow of working fluid The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
a valve body;
a moveable plug inside the valve body, the moveable plug having an outer surface with a groove that extends longitudinally;
an insert that resides in the groove; and
a lock coupled with the plug and in contact with the insert,
wherein the lock is configured to prevent the insert from moving in the groove.

2. The valve of claim 1, wherein the insert comprises a material that is different from the material of the moveable plug.

3. The valve of claim 1, wherein the insert fills a portion of the groove.

4. The valve of claim 1, wherein the insert fills all of the groove.

5. The valve of claim 1, wherein the insert comprises a first part and a second part that contact one another at one end.

6. The valve of claim 1, wherein the insert comprises ceramic.

7. The valve of claim 1, wherein the plug comprises metal alloy and the insert comprises ceramic.

8. The valve of claim 1,
wherein the lock is disposed on an end of the plug and secured in position with a fastener, and
wherein the lock generates a load on the insert.

9. The valve of claim 1, further comprising:
wherein the lock is disposed on an end of the plug and attached with a fastener, and
wherein the lock prevents the insert from exiting the plug.

10. A valve, comprising:
a valve body;
a closure member moveable in the valve body, the closure member comprising:
a plug having an outer surface with at least a longitudinal groove formed therein, the longitudinal groove extending from one end of the plug and terminating at a tapered region on the outer surface; and
an insert disposed in the groove,
wherein the insert forms an outwardly facing surface, and
wherein the insert comprises a first part and a second part that remove from the groove independent from one another.

11. The valve of claim 10, wherein the outwardly facing surface comprises material that is more brittle than the plug.

12. The valve of claim 10, wherein the outwardly facing surface comprises ceramic.

13. The valve of claim 10, wherein the insert resides in the tapered region.

14. The valve of claim 10, wherein the outwardly facing surface is tapered.

15. A closure member for a valve, comprising:
an elongate body with a central axis and an outer surface having a control section that is configured to direct fluid along a path that extends longitudinally on the surface along the central axis, the control section featuring removable parts that separate from the elongate body, at least one of the removeable parts forming a tapered surface; and
a lock and a fastener that attaches the lock to the elongate body and prevents the removable parts from separating from the elongate body.

16. The closure member of claim 15, wherein the removeable parts comprise ceramic and the elongate body comprises metal alloy.

17. The closure member of claim 15, wherein the removeable parts are harder than the elongate body.

18. The closure member of claim 15, wherein the control section comprises a longitudinal groove in the elongate body, the longitudinal groove configured to receive the removeable parts.

19. The closure member of claim 15, wherein the control section comprises a plurality of longitudinal grooves in the elongate body, each of the plurality of longitudinal grooves configured to receive the removeable parts.

20. The closure member of claim 15, wherein the control section comprises a plurality of longitudinal grooves in the elongate body, and
wherein a set of the removable parts reside in each of the plurality of each of the plurality of longitudinal grooves.

* * * * *